(12) United States Patent
Geis et al.

(10) Patent No.: US 9,941,758 B2
(45) Date of Patent: Apr. 10, 2018

(54) METHOD FOR PRODUCING A ROTOR

(71) Applicant: SIEMENS AKTIENGESELLSCHAFT, München (DE)

(72) Inventors: Peter Geis, Bad Neustadt (DE); Marko Glück, Bad Neudstadt (DE); Björn Knorre, Bad Neudstadt (DE); Andreas Kraus, Sondheim (DE); Jürgen Martin, Regensburg (DE); Melanie Sterzinger, Mellrichstadt-Bahra (DE); Dietmar Streit, Oberstreu (DE); Juliane Then, Münnerstadt (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 259 days.

(21) Appl. No.: 14/804,975

(22) Filed: Jul. 21, 2015

(65) Prior Publication Data

US 2016/0028282 A1    Jan. 28, 2016

(30) Foreign Application Priority Data

Jul. 22, 2014  (EP) .................................... 14177992

(51) Int. Cl.
*H02K 1/27*  (2006.01)
*H02K 1/28*  (2006.01)
*H02K 15/03* (2006.01)

(52) U.S. Cl.
CPC .............. *H02K 1/28* (2013.01); *H02K 1/278* (2013.01); *H02K 15/03* (2013.01)

(58) Field of Classification Search
CPC ........... H02K 1/28; H02K 1/278; H02K 15/03

USPC .................................................... 310/156.28
IPC ..................... H02K 1/27,1/28, 15/03
See application file for complete search history.

(56) References Cited

U.S. PATENT DOCUMENTS

| 5,801,470 A * | 9/1998 | Johnson ............... H02K 1/2733 |
| | | 310/156.27 |
| 6,047,461 A | 4/2000 | Miura et al. |
| 7,791,239 B2 * | 9/2010 | Martin ..................... H02K 1/28 |
| | | 310/156.08 |
| 8,304,948 B2 * | 11/2012 | Lantto .................... H02K 1/278 |
| | | 310/156.11 |
| 2010/0019589 A1 | 1/2010 | Saban et al. |

(Continued)

FOREIGN PATENT DOCUMENTS

| DE | 10 2007 016 771 | 10/2008 |
| DE | 10 2007 016 771 B4 | 2/2009 |
| EP | 2 149 965 A1 | 2/2010 |

(Continued)

*Primary Examiner* — John K Kim
(74) *Attorney, Agent, or Firm* — Henry M. Feiereisen LLC (57) ABSTRACT

In a method for producing a rotor, permanent magnets are arranged about a lateral surface in a recess of a rotor body from a selected position, e.g. a central position of the longitudinal extension of the rotor body, toward one side or toward two sides along an axis of rotation of the rotor body in side-by-side disposition. An end plate band covers a variable gap formed as a result of manufacturing tolerances of the permanent magnets between an outer face of an outermost one of the permanent magnets and an inner surface of the recess in an area of the recess which is non-parallel to the lateral surface. Subsequently, the permanent magnets and the end plate band are covered with a sleeve.

14 Claims, 6 Drawing Sheets

(56) References Cited

U.S. PATENT DOCUMENTS

2016/0028282 A1\* 1/2016 Geis .................. H02K 1/28
                                                    310/156.28

FOREIGN PATENT DOCUMENTS

EP        2 685 607 A1    1/2014
EP        2 685 615 A1    1/2014

\* cited by examiner

METHOD FOR PRODUCING A ROTOR

CROSS-REFERENCES TO RELATED APPLICATIONS

This application claims the priority of European Patent Application, Serial No. 14177992.6, filed Jul. 22, 2015, pursuant to 35 U.S.C. 119(a)-(d), the disclosure of which is incorporated herein by reference in its entirety as if fully set forth herein.

BACKGROUND OF THE INVENTION

The present invention relates to a method for producing a rotor. The invention also relates to a rotor and a spindle which has been produced by this method. The invention further relates to an electric machine, in particular a permanently excited synchronous machine, having such a rotor.

The following discussion of related art is provided to assist the reader in understanding the advantages of the invention, and is not to be construed as an admission that this related art is prior art to this invention.

A rotor of a permanently excited synchronous machine typically includes a laminated core and a plurality of permanent magnets which are arranged on the lateral surface in rows along the axis of rotation. Optionally, a sleeve of non-magnetic material can be wrapped around. Oftentimes, the lateral surface of the rotor is covered with rows of permanent magnets, with the rows of permanent magnets being arranged tightly juxtaposed against one another around the lateral surface of the rotor.

To date, the permanent magnets are arranged in a wall-like (offset) pattern on the rotor. The offset pattern, analogous to an arrangement of bricks in a wall, has been chosen because of the absence of a gap between the permanent magnets into which the sleeve could penetrate during or after the fitting (winding) process so that the surface of the sleeve becomes uneven and the permanent magnets may become displaced out of their optimal position.

It would be desirable and advantageous to address prior art problems and to obviate prior art shortcomings in general.

SUMMARY OF THE INVENTION

According to one aspect of the present invention, a method for producing a rotor includes arranging permanent magnets about a lateral surface in a recess of a rotor body from a selected position toward one side or toward two sides along an axis of rotation of the rotor body in side-by-side disposition, covering by an end plate band a variable gap formed between an outer face of an outermost one of the permanent magnets and an inner surface of the recess in an area of the recess which is non-parallel to the lateral surface, and wrapping a sleeve around at least part of the lateral surface of the rotor body and/or the outer face of the permanent magnets.

With a method according to the present invention, a rotor can be produced which can be populated with permanent magnets having different manufacturing tolerances and which is particularly powerful and energy-efficient.

According to another aspect of the present invention, a rotor includes a rotor body having a recess, permanent magnets arranged in the recess such that a variable gap is formed between an end face of an outermost one of the permanent magnets and an inner surface of the recess in an area of the recess which is non-parallel to the lateral surface, an end plate band configured to cover the variable gap, and a sleeve wrapped around an outer periphery of the permanent magnets, the end plate band and at least part of the lateral surface of the rotor body.

A rotor according to the present invention has a smooth lateral surface devoid of indentations.

In the production of a rotor, permanent magnets are advantageously arranged on a lateral surface of the rotor, in particular in a recess in the lateral surface. To that end, starting from a position, permanent magnets are arranged next to one another in rows along the axis of rotation of the rotor toward one side or toward two sides. A rotor generally has a plurality of such rows lying tightly juxtaposed against one another.

Prefabricated permanent magnets having a length, width and height are used as permanent magnets. The permanent magnets lie tightly against one another in a row so as to effectively prevent the presence of a gap between the permanent magnets. The rows are adjacent to one another. The rows can be spaced apart or not, depending on the field of application of the rotor.

Permanent magnets frequently have a manufacturing tolerance in their dimensions, such as length, width and height. In particular in an arrangement of the permanent magnets in rows along the axis of rotation (longitudinal axis) of the rotor, the manufacturing tolerances, when added together, may yield a different total length of the rows. As a result, different rows of permanent magnets are formed into rows of different overall lengths. The clearance along the circumference on the lateral surface between the end of the permanent magnets and an end of the recess, defined by an inner surface of the recess extending approximately at right angle to the lateral surface, forms the variable gap. The variable gap is covered by the end plate band.

After the permanent magnets have been arranged on the rotor and the end plate band has been fitted, the rotor can be wrapped with a sleeve, in particular a bandage. The sleeve serves to stabilize the position of the permanent magnets on the lateral surface of the rotor. The sleeve additionally serves to produce a smooth lateral surface, in particular so that the sleeve will not intrude into gaps between the permanent magnets and cause indentations in the surface.

In accordance with the present invention, manufacturing tolerances of the permanent magnets no longer lead to a gap between the permanent magnets. The differences in length accordingly lead henceforward only to one (or two) variable gap(s) on the at least one side of the arrangement, the variable gap extending once around the lateral surface.

By virtue of the method proposed here, the permanent magnets can advantageously be arranged without a clearance (per magnet pole) and directly adjacent to one another (and not in an offset pattern) in a particularly space-saving manner in the recess of the rotor. This removes the need for the permanent magnets to be cut to a specific shape and more permanent magnets can be arranged on a rotor.

The recess of the rotor, in particular areas thereof and extending axially, is advantageously formed in the lateral surface. In the case of a rotor having a laminated core, the recess can be realized by laminations in the center of the rotor which are chosen so as to have a smaller diameter than the laminations which are used in the boundary regions of the rotor (close to the base surface and/or to the top surface). A contour can also be incorporated into the recess based on a choice of the respective diameters.

The arrangement of the permanent magnets in the recess affords the advantage that the outer faces of the permanent magnets can form a surface, in particular in a flush-fitting manner, with the lateral surface of the rotor and a sleeve does not have to bridge differences in height.

According to another advantageous feature of the present invention, the permanent magnets can be arranged such as to prevent the sleeve from penetrating during a winding process into a gap between the permanent magnets or into the variable gap The arrangement of the permanent magnets starting from a position permits the permanent magnets to be arranged directly adjacent to one another so that no macroscopic gap is produced between the permanent magnets themselves. The manufacturing tolerances merely result in the variable gap, which is covered separately with the end plate band.

The variable gap is established by the axial distance of the end of the row of the permanent magnets and an inner face of the recess extending approximately parallel to a base surface or to a top surface. In the event, the permanent magnets are arranged on the lateral surface of the rotor, i.e. not in a recess, the end plate band covers the outer edges of the permanent magnets which have been arranged at the respective end of the row. In such an embodiment, the end plate band does not bridge a quadrangular cutout, but encloses a triangular offset.

Advantageously, more and/or larger permanent magnets can thus be integrated as appropriate into the rotor, since there is no longer any gap produced between the permanent magnets themselves or, as the case may be, only a natural gap due to the unevenness of the surfaces of the permanent magnets. Furthermore, because the variable gap is covered, the cutting of permanent magnets to a specific shape can be reduced.

According to another advantageous feature of the present invention, the recess has at least one boundary region which can be configured to have at least one area which protrudes deeper into the rotor body.

Because the end plate band can have a thickness of 0.5 to 2 millimeters and/or because at one point at least the sleeve has to be wrapped around the rotor a number of times in some areas to produce an adequate tension, it is advantageous to adapt the contour or the recess accordingly. For example, at both sides located close to the base surface or top surface of the rotor, a triangular notch can be made in the recess so that the permanent magnets located at the respective end of the arrangement are inclined slightly toward the axis of rotation. The recess resulting on account of the contour can be filled with the end plate band such that a smooth surface results which is subsequently covered with a sleeve.

An additional recess can also be incorporated into the lateral surface in order to receive areas of the sleeve, in particular in places where the sleeve is to be applied more thickly. When the sleeve is made of a bandage that is wound around the lateral surface of the rotor, a further recess in an area where the bandage is wound around the rotor a number of times is beneficial. A flush-fitting termination can be achieved in this way.

According to another advantageous feature of the present invention, the position can extend parallel to a top surface and/or parallel to a base surface around the lateral surface of the rotor body.

In the case of a cylindrical rotor body, the permanent magnets are arranged starting from a central position on the rotor body circumferentially toward one side or toward two sides. With the arrangement of the permanent magnets next to one another in the direction of rotation, such rows (comprised of permanent magnets arranged adjacent to one another), spaced apart from one another if necessary, are arranged around the lateral surface of the rotor. Accordingly, the position results as a circumference of the lateral surface of the rotor body. In the case of a spaced-apart arrangement of the rows, the position can be defined only as points/sections on the circumference.

Advantageously, this position or the circumference which defines the position, is arranged approximately at half the height of the rotor if the permanent magnets are arranged next to one another in two directions.

When the permanent magnets are arranged in a row starting from one side of the recess toward the other, the position is defined around the side on which the permanent magnets abut at one side or at which the rows of the permanent magnets begin.

According to another advantageous feature of the present invention, the sleeve can be implemented by a bandage.

The sleeve serves to stabilize the permanent magnets on the rotor, in particular against centrifugal forces. In addition, the sleeve serves to provide a uniform surface of the rotor without elevations/depressions. The permanent magnets are normally incorporated into the laminated core of the rotor and/or arranged in the rotor recess provided for that purpose. In order to counteract the centrifugal forces which act on the permanent magnets during the rotation of the rotor, the permanent magnets and/or the rotor itself are/is provided with a sleeve. In this way a securement of the permanent magnets on the rotor can be reinforced.

A bandage is particularly suitable as a sleeve. The bandage advantageously is made of a fiber material, for example glass fibers which are held together in a matrix in a band-shaped structure. This structure, similarly to an adhesive tape, is advantageously wound around the rotor several times at one end initially. In this way an adequate tensile strength can be provided for the further windings, the bandage being wound around the permanent magnets. After the matrix has been cured, where applicable, the bandage forms a stable sleeve around the rotor, since the permanent magnets are protected against the effect of the centrifugal forces. The bandage additionally forms a smooth surface. At the sections in which the bandage is applied several times, the surface of the rotor, of the recess and, where appropriate, of the further recess is adapted so that the radius is the same over the entire rotor.

According to another advantageous feature of the present invention, the position can be selected approximately at half a height of the lateral surface of the rotor body, with the permanent magnets being arranged on both sides in a direction of rotation of the rotor body, wherein the variable gap is covered with the end plate band in close proximity to a base surface and/or a top surface of the rotor body. In this advantageous embodiment, the permanent magnets are arranged starting from the center in each case along the axis of rotation next to one another to form rows which abut one another (and possibly have areas that touch one another). The permanent magnets are arranged in the direction of the top surface and of the base surface of the rotor. The end plate band serves to cover the two variable gaps close to the base surface and to the top surface.

The end plate band can also be embodied as an end plate ring which is spanned across the respective variable gap.

The end plate ring can be embodied as a closed ring as well as in the form of multiple segments. The end plate band can also be present in a slotted form/embodiment. The end plate band and/or a further band can also be used for covering further gaps opening up in the axial direction, e.g. between individual permanent magnets.

The magnets can be arranged partially at an angle in order to receive the end plate band. The angle is realized by an inclined positioning of the magnets close to the variable gap. The compactness of the rotor is increased in addition as a result of the inclined positioning.

According to another advantageous feature of the present invention, the end plate band can be made of a material selected from the group consisting of plastic and metal, with the material having only a negligible detrimental effect on a propagation of a magnetic field. The end plate band advantageously can be made of copper, aluminum or another non-magnetic material so that the magnetic field of the permanent magnets is not negatively affected. Depending on the load imposed on the rotor, the end plate band may also be made of plastic such as Teflon or PVC.

According to another advantageous feature of the present invention, the recess can have a depth and contour sufficient to establish a constant radius over a length of the rotor body in parallel relationship to the axis of rotation, after applying the sleeve.

Because it may be necessary, in order to realize a particularly stable embodiment of the rotor, to apply the sleeve, in particular the bandage, to a varying thickness, it is advantageous, in order to achieve as smooth a surface as possible, to adapt the recess accordingly in shape, depth and contour.

At those areas where the permanent magnets are arranged at an angle in the direction of rotation (inclined toward the axis of rotation), it is necessary to deepen areas of the recess, with the deepening of the recess having e.g. a triangular or step-shaped contour.

The recess can advantageously be comprised of a plurality of individual recesses. Thus, the rotor body can have a recessed area in addition to the recess for the permanent magnets in order to provide the sleeve with a stable hold without having a surface area with increase in the radius of the rotor.

It will be understood that foregoing description is, of course, not limited to a rotor, in particular not to a rotor of a dynamoelectric machine. The technical teaching described here is in particular applicable also in the production of a spindle, in particular a motor spindle, for a machine tool for example.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Throughout all the figures, same or corresponding elements may generally be indicated by same reference numerals. These depicted embodiments are to be understood as illustrative of the invention and not as limiting in any way.

It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. Furthermore, the figures of the drawings, the associated descriptions and the claims contain numerous features in combination. At the same time it is clear to a person skilled in the art that the features can also be considered individually, or they can be brought together to form further combinations that are not explicitly disclosed here.

Figure 1:
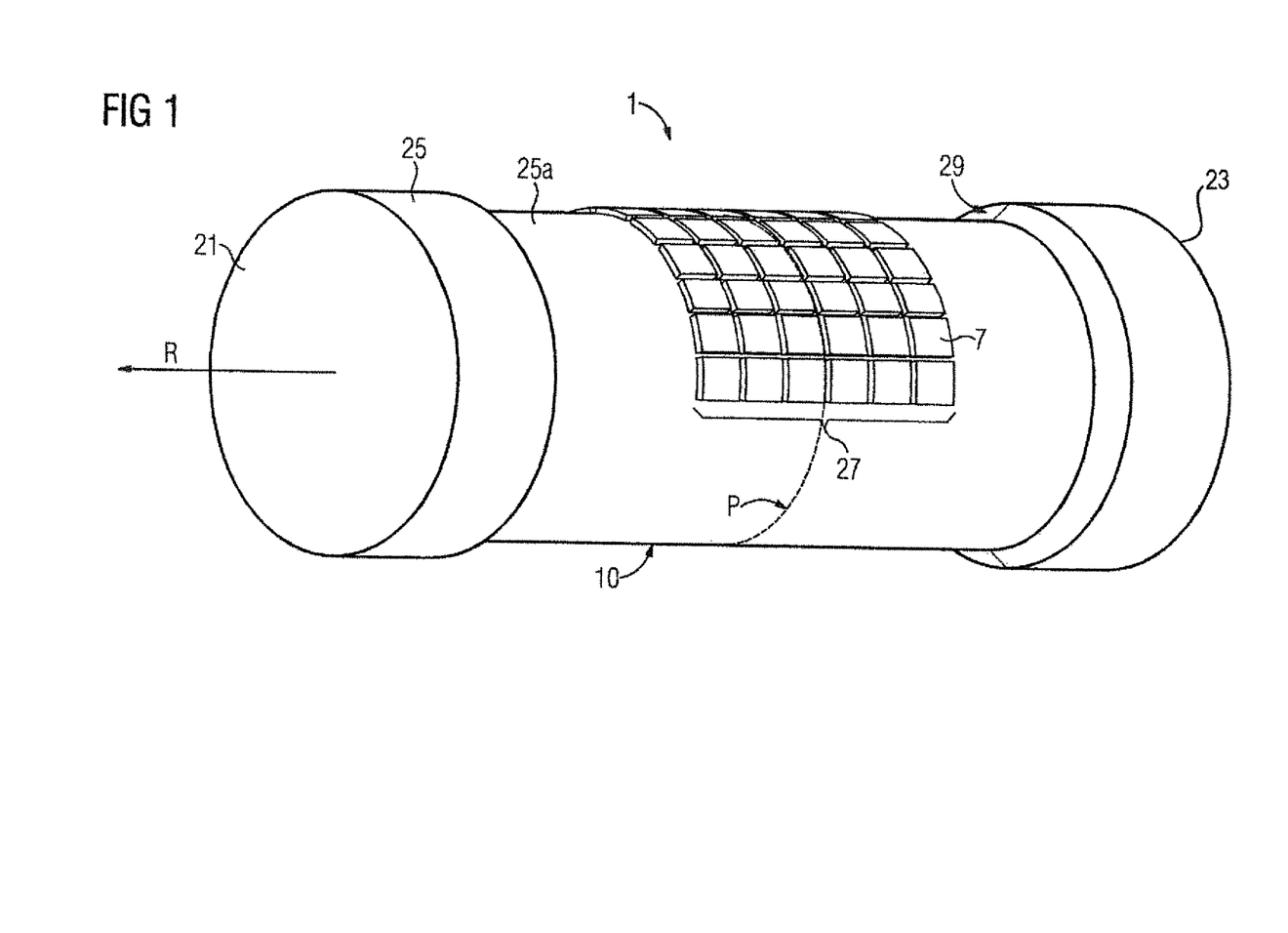
FIG. 1 is a perspective view of one embodiment of a rotor.

Turning now to the drawing, and in particular to FIG. 1, there is shown a perspective view of one embodiment of a rotor, generally designated by reference numeral 1. The rotor 1 is shown here, by way of example, as having a cylindrical rotor body. The rotor 1 has a lateral surface 25 as well as a base surface 21 and a top surface 23. The rotor 1 has a recess 10 on its lateral surface 25, wherein the recess 10 possesses two inner surfaces 29 which may extend in parallel relationship to the base surface 21 and to the top surface 23, respectively. As an alternative, at least one of the inner surfaces 29 can, however, also be inclined with respect to the base surface 21 or the top surface 23, as shown in FIG. 1.

The recess 10 additionally has a lateral surface 25a which is shifted toward the axis of rotation R. Starting from a position P, the permanent magnets 7 are arranged in rows 27 on the shifted lateral surface 25a. As shown, the rows 27 of permanent magnets 7 are arranged next to one another and, following termination of the method of arranging the permanent magnets 7, can virtually cover the shifted lateral surface 25a, except for the variable gaps 9a (FIG. 2).

The rotor 1 is defined by an axis of rotation R, the axis of rotation R advantageously extending through the center of gravity of the rotor 1.

Sectional views of the rotor 1 are shown below for the sake of greater simplicity of illustration.

Figure 2:
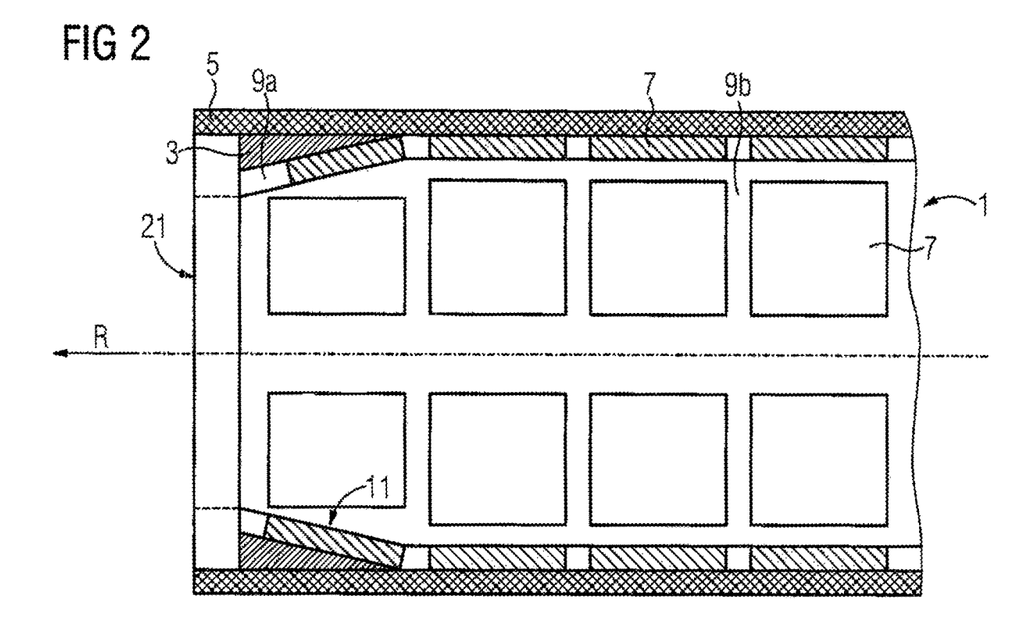
FIG. 2 is a sectional view of a detail of a rotor.

FIG. 2 shows a rotor 1 in a sectional view. The rotor 1 has permanent magnets 7 on its lateral surface 25, the permanent magnets 7 being arranged in the recess 10 around the shifted lateral surface 25a. The permanent magnets 7 are arranged in a recess 10 so that the permanent magnets 7 retain their position also during the rotation of the rotor 1. On one side, the recess 10 of the rotor 1 has an inwardly pointing, triangular contour 11. On account of the contour 11 of the recess 10, the permanent magnets 7 which are arranged adjacent to the inner surface 29 are inclined slightly toward the axis of rotation R.

Due to the manufacturing tolerances of the permanent magnets 7, i.e. different lengths and widths of the permanent magnets 7, each of the rows 27 has a slightly different overall length. Because of the different overall lengths of the rows 27, from the position P to almost up to the respective inner surface 29, a variable gap 9a is formed between the corresponding outer face of the obliquely arranged permanent magnets 7 and the inner surface 29. The variable gap 9a is defined by the sides of the permanent magnets 7 and the inner surface 29 as well as of the internal recess 10. The variable gap 9a is covered by the end plate band 3. The end plate band 3 can advantageously be made of a metal band which is wound around at least once over the variable gap 9a. The end plate band 3 can, as shown, have a triangular profile. The end plate band can, however, also have a rectangular profile and/or be braced on one side on the lateral surface 25, the lateral surface having a small ledge, on one side and on the permanent magnets 7 on the other side.

The end plate band 3 can also be embodied in the form of a ring. During the production of the rotor 1, the annular end plate band 3 can then be pushed over the variable gap 9a in order to cover sections of the permanent magnets 7 in the direction of rotation R. The permanent magnets 7 are enclosed by a sleeve 5. The sleeve 5 serves to secure the permanent magnets 7 at their designated position, in particular at their radial position on the (shifted) lateral surface 25, 25a. The sleeve 5 is advantageously a bandage 5, glass fibers impregnated with resin, for example, or a glass fiber reinforced tape. After being wound on, the bandage 5 is cured and forms a strong shaping around the rotor 1. In the production method disclosed here, the combination of the sleeve 5 and the end plate band 3 results in a particularly smooth outer lateral surface of the rotor.

Such a smooth lateral surface advantageously reduces the friction during the rotation of the rotor.

Figure 3:
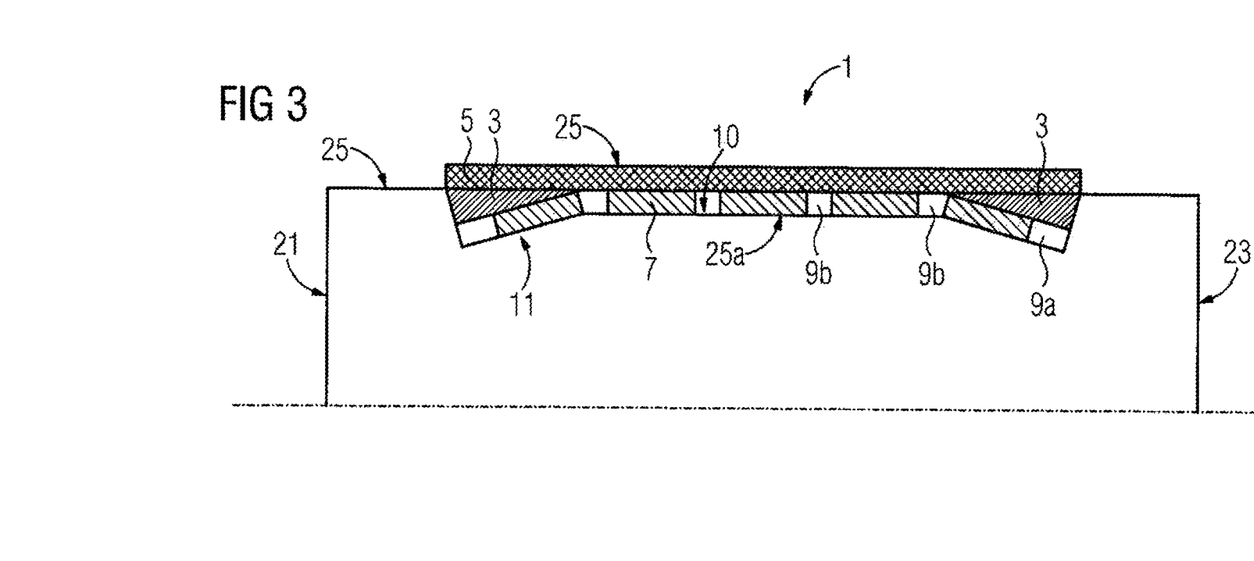
FIG. 3 is another sectional view of a detail of a rotor.

FIG. 3 shows a rotor 1 in a sectional view, wherein the recess 10 has a triangular contour 11 in sections close to the ends such that the permanent magnets 7 are arranged in the center of the recess 10 along a shifted lateral surface 25a. Located between the permanent magnets 7 in the center of the row 27 is the gap 9b, the gap 9a being chosen to be as narrow as possible. The contour 11 is located at both ends of the recess 10 in order to compensate for the manufacturing tolerances of the permanent magnets 7, the further contour 11 having a triangular shape directed toward the axis of rotation R. The permanent magnets 7 which are arranged in the region of the recess 10 having the contour 11 are inclined toward the axis of rotation R of the rotor 1. The variable gap 9a extends with variable dimensions between the inclined permanent magnets 7 and the inner surface 29 of the recess 10. The width of the variable gap 9a is different depending on position and results due to the manufacturing tolerances of the permanent magnets 7.

The variable gap 9a is covered by means of the end plate band 3. Suitable choice of the end plate band 3 will result in the lateral surface 25 of the rotor 1 having a smooth exterior face. A sleeve 5 can accordingly be applied in such a manner as to ensure that the lateral surface 25 of the sleeve 5 or of the rotor 1 has a smooth exterior face. The radially extending gap 9b between the permanent magnets 7 arranged in the inside of the row 27 is shown exaggeratedly large in FIG. 2, although the permanent magnets 7 touch one another as far as possible. This prevents the sleeve from being drawn into the gap 9b. The result is a smooth exterior face of the sleeve 5 and consequently a smooth lateral surface 25 of the rotor.

Figure 4:
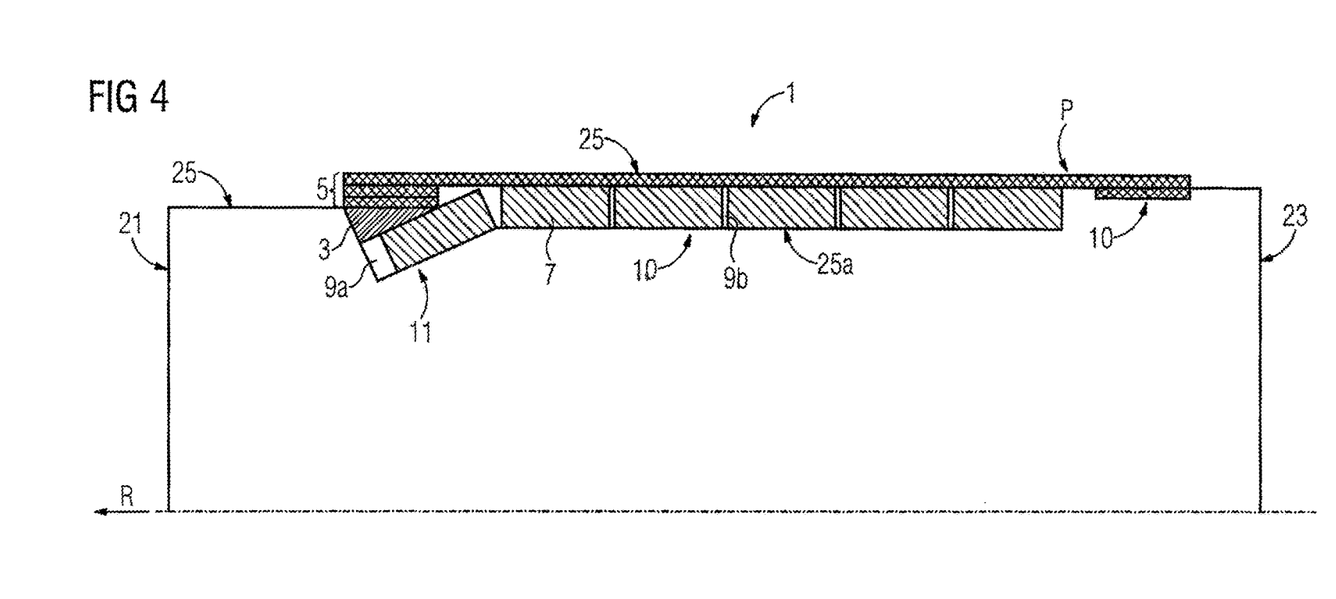
FIG. 4 is a sectional view of another embodiment of a rotor.

FIG. 4 shows a further embodiment of a rotor 1 which has been produced by means of the method according to the invention. The rotor 1 has a recess 10 which is provided for the purpose of positioning the permanent magnets 7. The recess 10 has a contour 11 on one side. The permanent magnets 7 which have been arranged close to the contour 11 have one side inclined slightly toward the axis of rotation R of the rotor 1. Starting from the position P, the permanent magnets 7 have been arranged in a row 27 in each case in the direction toward the contour 11. On one side of the recess 10, the permanent magnets 7 which have been arranged starting from the position P touch the inner surface 29 of the recess. Thus, the inner surface 29 of the recess defines the position P. The gap 9b between the permanent magnets 7 themselves is in this case chosen to be as small as possible, i.e. the permanent magnets 7 touch one another in their tangential orientation along the (shifted) lateral surface 25, 25a of the rotor 1. Due to the manufacturing tolerances of the permanent magnets 7, the variable gap 9a is produced between the last-arranged permanent magnets 7 close to the inner surface 29 inclined at an angle to the top surface 21 of the rotor. The variable gap 9a is covered by the end plate band. In the embodiment variant shown here, the end plate band 3 is depicted as thin and triangular in profile. Compared to the lateral surface of the rotor, the surface of the end plate band 3 is shifted somewhat toward the axis of rotation R.

As a result of the contour 11 and/or the profile of the end plate band 3 there is produced in sections a ledge which is advantageously covered to an increased extent by the sleeve 5, in particular by the bandage 5.

Such a reinforced application of sleeving to the lateral surface 25 of the rotor 1 advantageously serves to generate an increased winding tension in the bandage 5. Thus, the bandage 5 is wound several times around the rotor 1 in the region of the ledge and there is thereby created the possibility of its being wound with an increased tension/tensile strength. A further region of the recess 10 is likewise used for increased application of the bandage onto the rotor in order to enable the sleeving by means of the bandage 5 to be given increased stability.

Ledges as, well as recesses 10 present in sections serve in an advantageous manner, as illustrated here by way of example, to accommodate an increased application of the bandage 5 onto the rotor, wherein a smooth lateral surface 25 of the rotor can be ensured after production.

Figure 5:
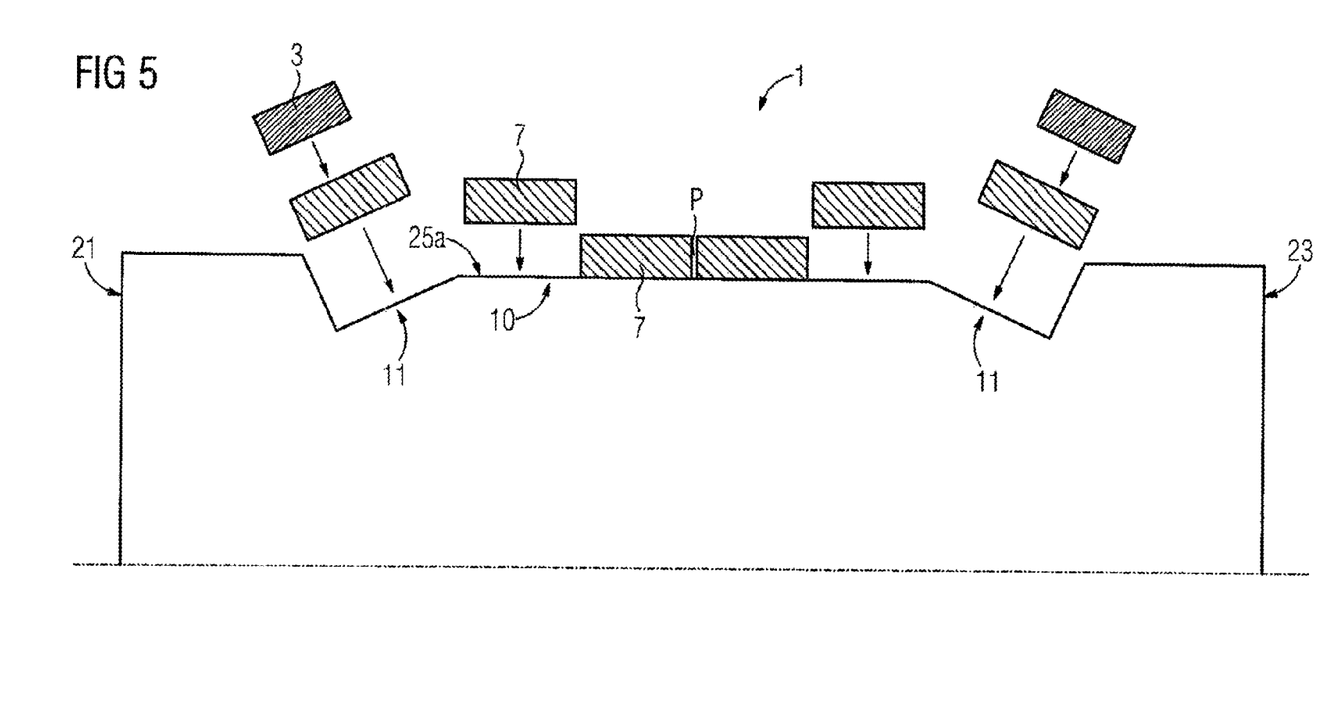
FIG. 5 is an exploded view of the rotor of FIG. 4 with a recess.

FIG. 5 shows an exploded view of the rotor 1 with its recess 10. FIG. 5 serves in particular to illustrate the method for producing a rotor 1. In the method for producing the rotor 1, the permanent magnets 10 are fitted, starting from the position P, in both directions along the axis of rotation R of the rotor 1. In this case the gaps 9b between the permanent magnets 7 are chosen to be as small as possible such that the permanent magnets touch one another. The permanent magnets 7 are thus arranged in a row 29 in each case. The permanent magnets 7 which are located at the respective end of the row 27 are arranged inclined slightly at an angle, following the contour 11 of the recess. After the permanent magnets 7 have been positioned in their intended places in the recess 10, the variable gap 9a is covered with the end plate band 3. The end plate band 3 can have, as shown, an angular profile conforming to the contour 11. Equally, the end plate band 3 can be wound/pushed over the variable gap 9a such that it bears on a ledge 31 of the rotor 1 on one side. On the other side, the end plate band 3 then bears on the last-arranged permanent magnet 7 of the respective row.

The end plate band 7 is advantageously fixed by means of a force fit or with the aid of the sleeve which is fitted subsequently to the end plate bands 3.

After the rotor has been populated with the permanent magnets 7, the sleeve is fitted onto the rotor. Advantageously, as already disclosed, a bandage 5 is wound around the permanent magnets (or around the rows of permanent magnets 7). This winding process is advantageously commenced on one side, for example close to the base side 21 on the lateral surface 25 of the rotor 1, preferably in the region of the contour of the recess. The result produced over the course of the winding process is a high tensile strength, a high degree of stability of the rotor 1 and a smooth lateral surface 25 once the bandage 5 has dried.

A rotor 1 or a spindle which has been produced by means of the method disclosed here has a particularly smooth exterior face of the lateral surface 25 and removes the requirement, hitherto necessary in the prior art, for the permanent magnets 7 to be offset relative to one another in the direction of rotation of the rotor 1, with the result that the production of the rotor 1 is simpler and therefore more cost-effective.

Figure 6:
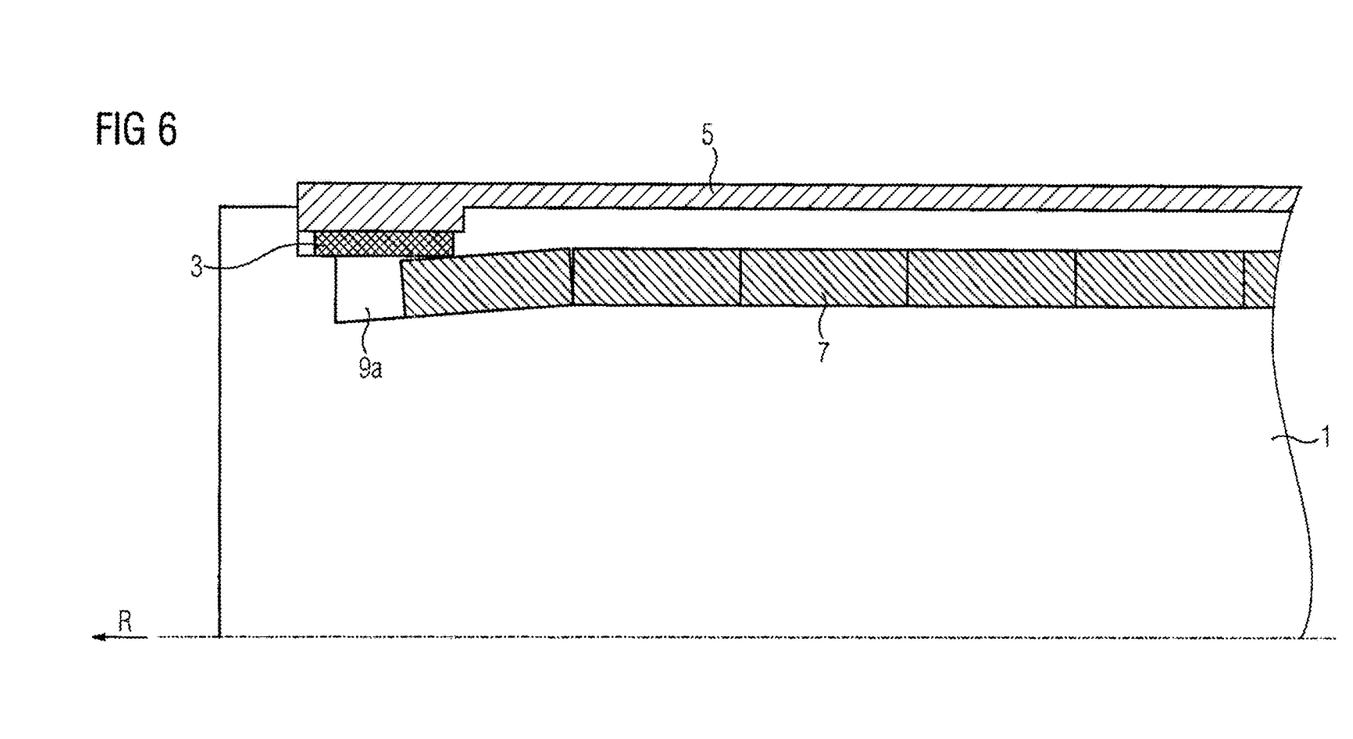
FIG. 6 is a schematic view of a rotor in cross-section.

FIG. 6 shows a schematic view of a rotor 1 in cross-section. The permanent magnets 7 are located, aligned in a row and abutting one another, on the rotor 1. Where appropriate, the permanent magnets 7 are secured to the lateral surface of the rotor 1. The permanent magnet 7 which is arranged closest to the inner surface is arranged offset slightly toward the inner surface and/or is arranged slightly obliquely. The outwardly directed permanent magnet 7 is advantageously offset between 0.5 and 2 millimeters toward the axis of rotation. The offset can occur due to a permanent magnet 7 having a lower height and/or due to a contour 11 in the rotor 1 or the recess 10. In the case of a slight inclined positioning of the corresponding permanent magnet 7, an angle of 0.5 to 3 degrees can be chosen. Located at the end of the row of permanent magnets 7, between the inner surface 29 and the offset/obliquely arranged permanent magnet 7, is the variable gap 9*a*.

The offset arrangement of the permanent magnets 7 and/or the inclined arrangement of the permanent magnets 7 toward the axis of rotation R cause an inwardly offset reduction in the outside radius of the rotor 1 in sections. This region is at least partially filled by the end plate band 3 and by the sleeve 7.

The end plate band 3 serves to bridge the variable gap 9*a*. The end plate band 3 can be a metal band or a plastic strap. The end plate band 3 has a thickness of 0.5 millimeters to 3 millimeters. The end plate band advantageously serves to cover the variable gap 9*a*. After being mounted, the end plate band 3 bears on one side in sections on the permanent magnets 7. On the other side, the end plate band 3 bears on the rotor 1, in particular on a cutout of the inner surface 29 of the rotor 1.

The end plate band 3 serves to cover the variable gap 9*a*. Covering the variable gap prevents the sleeve 5 from intruding into the variable gap 9*a*. Such an intrusion of the sleeve 5 into the variable gap 9*a* would result in a disadvantageous recess in the outwardly directed surface of the sleeve 5.

The sleeve 5 is for example a glass fiber reinforced tape which is wound, at least in sections, around the lateral surface 25 of the rotor 1 as well as around the outwardly directed sides of the permanent magnets 7.

In order to provide tension when the sleeve 5 is wound around the rotor 1 (in the embodiment populated with permanent magnets 7), the tape is wound around the same section several times at the beginning of its being wound, i.e. initially it is wound with several layers on top of one another in sections. Said several layers are advantageously applied in the region of the end plate band 3. In this way, the space present due to the offset/inclined arrangement of the corresponding permanent magnets 7 is advantageously filled, at least partially. A maximally smooth outer lateral surface of the rotor 1 is produced as a result.

To sum up, the invention relates to a method for producing a rotor 1 as well as to a rotor 1 or a spindle 1 produced according to said method. To that end, starting from a position P, in particular a position P which encircles the lateral surface 25 of a rotor 1 in a central position P of the longitudinal extension, the rotor 1 is fitted with permanent magnets 7 in each case in a row 27 in both directions. A contour 11 in at least one region of the recess 10 ensures that the permanent magnets 7 arranged last in each case in a row 29 are arranged inclined slightly toward the axis of rotation R of the rotor 1. The possibly resulting variable gap 9*a*, brought about due to the manufacturing tolerances of the permanent magnets 7, is covered by means of an end plate band 3. Subsequently, the permanent magnets 7 and the end plate band 3 are covered with a sleeve 5, in particular a bandage 5. In this case the sleeve 5 can be applied in a reinforced manner or wound on several times in the at least one region of the contour 11 of the recess 10 so as to produce an increase in tension. In this way the diameter of the sleeve 5 advantageously remains approximately constant and the rotor 1 thus produced has an increased smoothness on its lateral surface 25.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A method for producing a rotor, comprising:
   arranging permanent magnets about a lateral surface in a recess of a rotor body from a selected position toward one side or toward two sides along an axis of rotation of the rotor body in side-by-side disposition;
   covering by an end plate band a variable gap formed between an outer face of an axially outermost one of the permanent magnets and an inner surface of the recess in an area of the recess which is non-parallel to a side surface of the rotor; and
   wrapping a sleeve, made of a glass fiber reinforced tape, around at least part of the lateral surface of the rotor body and/or the outer face of the permanent magnets.

2. The method of claim 1, wherein the permanent magnets are arranged to prevent the sleeve from intruding during a winding process into a gap between the permanent magnets or into the variable gap.

3. The method of claim 1, wherein the recess has at least one boundary region which is configured to have at least one area which protrudes deeper into the rotor body.

4. The method of claim 1, wherein the position extends parallel to a top surface and/or parallel to a base surface around the lateral surface of the rotor body.

5. The method of claim 1, wherein the sleeve is configured as a bandage.

6. The method of claim 1, wherein the position is selected approximately at half a height of the lateral surface of the rotor body, said permanent magnets being arranged on both sides in a direction of rotation of the rotor body, wherein the variable gap is covered with the end plate band in close proximity to a base surface and/or a top surface of the rotor body.

7. The method of claim 1, wherein the end plate band is made of a material selected from the group consisting of plastic and metal, said material having only a negligible detrimental effect on a propagation of a magnetic field.

8. The method of claim 1, wherein the recess has a depth and contour sufficient to establish a constant radius over a length of the rotor body in parallel relationship to the axis of rotation, after applying the sleeve.

9. A rotor produced by the method of claim 1.

10. A spindle produced by a method of claim 1.

11. A rotor, comprising:
a rotor body having a recess;
permanent magnets arranged in the recess such that a variable gap is formed between an end face of an axially outermost one of the permanent magnets and an inner surface of the recess in an area of the recess which is non-parallel to a side surface of the rotor;
an end plate band configured to cover the variable gap; and
a sleeve made of a glass fiber reinforced tape wrapped around an outer periphery of the permanent magnets, the end plate band and at least part of the lateral surface of the rotor body.

12. The rotor of claim 11, wherein the recess for the permanent magnets has a contour sufficient to arrange the permanent magnets at an incline of the rotor toward one side.

13. An electric machine, comprising a rotor comprising a rotor body having a recess, permanent magnets arranged in the recess such that a variable gap is formed between an end face of an axially outermost one of the permanent magnets and an inner surface of the recess in an area of the recess which is non-parallel to a side surface of the rotor, an end plate band configured to cover the variable gap, and a sleeve made of a glass fiber reinforced tape wrapped around an outer periphery of the permanent magnets, the end plate band and at least part of the lateral surface of the rotor body.

14. The electric machine of claim 13 constructed as a permanently excited synchronous machine.

* * * * *